(12) United States Patent
Cheng et al.

(10) Patent No.: US 6,766,566 B2
(45) Date of Patent: Jul. 27, 2004

(54) RELEASABLE FASTENER SYSTEM

(75) Inventors: Yang-Tse Cheng, Rochester Hills, MI (US); Wangyang Ni, East Lansing, MI (US); John C. Ulicny, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/305,384

(22) Filed: Nov. 26, 2002

(65) Prior Publication Data

US 2004/0074065 A1 Apr. 22, 2004

Related U.S. Application Data

(63) Continuation-in-part of application No. 10/273,691, filed on Oct. 19, 2002.

(51) Int. Cl.[7] .......................... A44B 18/00; B29C 41/30; B32B 3/02
(52) U.S. Cl. .............................. 24/452; 24/442; 24/450; 24/451; 24/446; 24/304; 428/100
(58) Field of Search .......................... 24/442, 450, 451, 24/452, 446, 448, 304; 428/100

(56) References Cited

U.S. PATENT DOCUMENTS

| | | | | |
|---|---|---|---|---|
| 3,469,289 A | * | 9/1969 | Whitacre ..................... | 24/450 |
| 5,656,351 A | * | 8/1997 | Donaruma .................. | 428/100 |
| 5,669,120 A | * | 9/1997 | Wessels et al. ............... | 24/446 |
| 5,671,498 A | * | 9/1997 | Martin et al. .............. | 15/244.3 |
| 5,725,928 A | | 3/1998 | Kenney et al. ............. | 428/100 |
| 5,885,652 A | * | 3/1999 | Abbott et al. ............ | 427/163.2 |
| 5,945,193 A | * | 8/1999 | Pollard et al. .............. | 428/100 |
| 6,086,599 A | | 7/2000 | Lee et al. ................... | 606/108 |
| 6,546,602 B1 | * | 4/2003 | Eipper et al. ................. | 24/442 |
| 6,598,274 B1 | * | 7/2003 | Marmaropoulos ........... | 24/451 |

FOREIGN PATENT DOCUMENTS

WO     WO 01/84002     5/2001

OTHER PUBLICATIONS

U.S. patent application Publication No. US2002/0007884A1, Jan. 24, 2002; Schuster et al.

* cited by examiner

Primary Examiner—Victor Sakran
(74) Attorney, Agent, or Firm—Kathryn A. Marra

(57) ABSTRACT

A releasable fastener system comprises a loop portion and a hook portion. The loop portion includes a support and a loop material disposed on one side thereof. The hook portion includes a support and a plurality of closely spaced upstanding hook elements extending from one side thereof, wherein the plurality of hook elements comprises a fiber and a shape memory alloy coating deposited onto the fiber, and wherein the fiber and the shape memory alloy coating comprises a non-axisymmetric coating or deposition of the shape memory alloy about a portion of the fiber. When the hook portion and loop portion are pressed together they interlock to form a releasable engagement. The resulting joint created by the engagement is relatively resistant to shear and pull forces and weak in peel strength forces. Introducing a thermal activation signal to the plurality of hook elements causes a change in shape orientation, flexural modulus property, or a combination thereof that is effectively reduces the shear and/or pull off forces in the releasable engagement. In this manner, disengagement of the releasable fastener system provides separation of the hook portion from the loop portion under controlled conditions.

12 Claims, 2 Drawing Sheets

RELEASABLE FASTENER SYSTEM

CROSS-REFERENCE TO RELATED APPLICATIONS

This application is a continuation-in-part of U.S. application Ser. No. 10/273,691 filed Oct. 19, 2002, which is incorporated by reference herein in its entirety.

BACKGROUND

This disclosure relates to releasable attachment devices of the type used to fasten, retain, or latch together components of an apparatus or a structure that are to be separated or released under controlled conditions.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the releasable engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term 'pull force" refers to an action or stress resulting from applied forces that causes or tends to cause two contiguous parts of a body to move relative to each other in a direction perpendicular to their plane of contact. Shape memory alloys generally refer to a group of metallic materials that demonstrate the ability to return to some previously defined shape or size when subjected to an appropriate thermal stimulus. Shape memory alloys are capable of undergoing phase transformation in which their modulus, yield strength, and shape orientation is altered as a function of temperature. Generally, in the low temperature, or martensite phase, shape memory alloys can be plastically deformed and upon exposure to some higher temperature will transform to an austenitic phase, or parent phase, returning to their shape prior to the deformation. Materials that exhibit this shape memory effect only upon heating are referred to as having a one-way shape memory alloy. Those materials that also exhibit shape memory upon re-cooling are referred to as two-way shape memory alloys.

BRIEF SUMMARY

Disclosed herein is a releasable fastener system comprising a loop portion comprising a support and a loop material attached to the loop support; a hook portion comprising a support and a plurality of hook elements attached to the hook support, wherein the plurality of hook elements comprises a fiber and a shape memory alloy coating deposited onto a fiber, and wherein shape memory alloy coating deposited onto the fiber comprises a non-axisymmetric coating or deposition of the shape memory alloy about a portion of the fiber surface; and an activation device coupled to the plurality of hook elements, the activation device being operable to selectively provide a thermal activation signal to the shape memory alloy and change the shape orientation, the flexural modulus property, or a combination of the shape orientation and flexural modulus properties of the plurality of hook elements to reduce a shear force and/or a pull-off force of an engaged hook and loop portion.

In accordance with another embodiment, a releasable fastener system comprises a loop portion comprising a support and a loop material attached to the support; a hook portion comprising a support and a plurality of hook elements attached to the support, wherein the plurality of hook elements comprises a fiber and a shape memory alloy coating deposited onto the fiber, and wherein the fiber and the shape memory alloy coating or deposition disposed on the surface of the fiber comprises a non-axisymmetric coating or deposition of the shape memory alloy about a portion of the fiber surface; and means for changing the shape orientation, the flexural modulus property, or the combination thereof of the hook elements to reduce a shear force and/or a pull-off force of an engaged hook and loop portion.

A process for operating a releasable fastener system comprises contacting a loop portion with a hook portion to form a releasable engagement, wherein the loop portion comprises a support and a loop material attached to the support, and wherein the hook portion comprises a support and a plurality of hook elements attached to the support, wherein the plurality of hook elements comprises a fiber and a shape memory alloy coating deposited onto the fiber, and wherein the fiber and the shape memory alloy coating comprises a non-axisymmetric coating or deposition of the shape memory alloy about a portion of the fiber surface; maintaining constant shear and pull-off forces in the releasable engagement without introducing an energy signal; selectively introducing a thermal activation signal to the hook elements, wherein the thermal activation signal is effective to change a shape orientation, a flexural modulus property, or a combination thereof to the plurality of hook elements; and reducing the shear and/or pull off forces in the releasable engagement.

A hook portion for a releasable fastener system comprises a support; and comprising a support and a plurality of hook elements attached to the support, wherein the plurality of hook elements comprises a fiber and a shape memory alloy coating deposited onto the fiber, and wherein the fiber and the shape memory alloy coating comprises a non-axisymmetric coating or deposition of the shape memory alloy about a portion of the fiber surface.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 1:
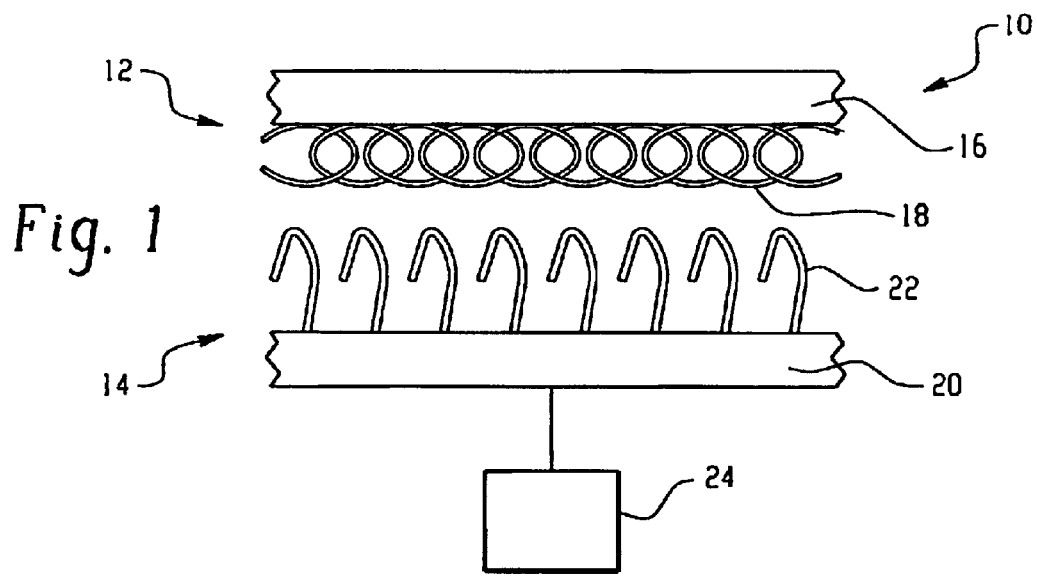
FIG. 1 is a cross sectional view of a releasable fastening system.

As shown in FIG. 1, a releasable fastener system, generally indicated as 10, comprises a loop portion 12 and a hook portion 14. The loop portion 12 includes a support 16 and a loop material 18 attached on one side thereof whereas the hook portion 14 includes a support 20 and a plurality of closely spaced upstanding hook elements 22 extending from one side thereof. The hook elements 22 generally comprise a fiber upon which a shape memory alloy is deposited or coated. The shape memory alloy coating or deposition provides the hook element 22 with a shape changing capability and/or a flexural modulus property change capability to the hook elements 22, as will be described in greater detail. Coupled to and in operative communication with the hook elements 22 is an activation device 24. The activation device 24, on demand, provides a thermal activation signal to the hook elements 22 to cause a change the shape orientation and/or flexural modulus properties of the hook elements 22. The change in shape orientation and/or flexural modulus property generally remains for the duration of the applied thermal activation signal. Upon discontinuation of the thermal activation signal, the hook elements 22 revert substantially to a relaxed or unpowered shape. The illustrated releasable fastener system 10 is exemplary only and is not intended to be limited to any particular shape, size, configuration, number or shape of hook elements 22, shape of loop material 18, or the like.

Figure 2:
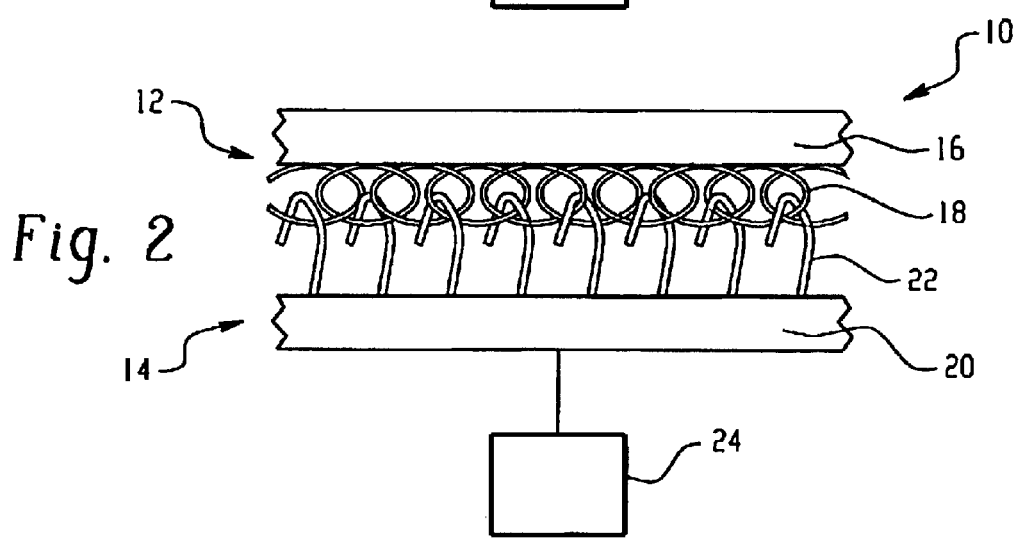
FIG. 2 is a cross sectional view of the releasable fastening system of FIG. 1, wherein the releasable fastening system is engaged.

During engagement, the two portions 12, 14 are pressed together to create a joint that is relatively strong in shear and/or pull-off directions, and weak in a peel direction. For example, as shown in FIG. 2, when the two portions 12, 14 are pressed into face-to-face engagement, the hook elements 22 become engaged with the loop material 18 and the close spacing of the hook elements 22 resist substantial lateral movement when subjected to shearing forces in the plane of engagement. Similarly, when the engaged joint is subjected to a force substantially perpendicular to this plane, (i.e., pull-off forces), the hook elements 22 resist substantial separation of the two portions 12, 14. However, when the hook elements 22 are subjected to a peeling force, the hook elements 22 can become readily disengaged from the loop material 18, thereby separating the hook portion 12 from the loop portion 14. It should be noted that separating the two portions 12, 14 using the peeling force generally requires that one or both of the supports forming the hook portion and loop portion be flexible.

Figure 3:
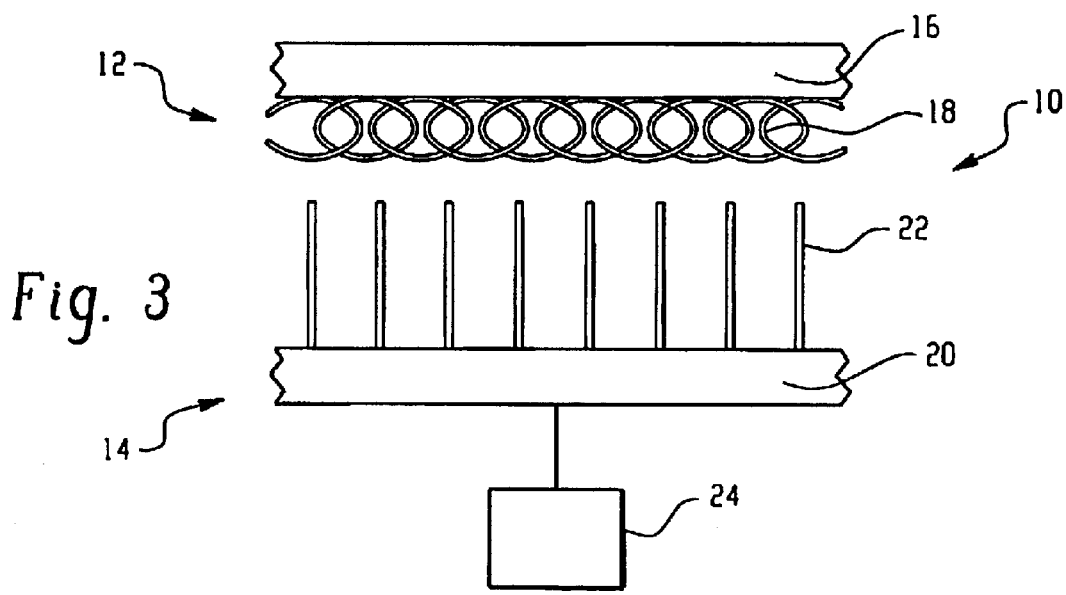
FIG. 3 is a cross sectional view of the releasable fastening system of FIG. 1, wherein the releasable fastening system is disengaged.

To reduce the shear and pull-off forces resulting from the engagement, the shape orientation and/or flexural modulus properties of the hook elements 22 are altered upon receipt of the thermal activation signal from the activation device 24 to provide a remote releasing mechanism of the engaged joint. That is, the change in shape orientation and/or flexural modulus of the hook elements reduces the shearing forces in the plane of engagement, and reduces the pull off forces perpendicular to the plane of engagement. For example, as shown in FIGS. 2 and 3, the plurality of hook elements can have inverted J-shaped orientations that are changed, upon demand, to substantially straightened shape orientations upon receiving the thermal activation signal from the activation device 24. The substantially straightened shape relative to the J-shaped orientation provides the joint with marked reductions in shear and/or pull-off forces. Similarly, a reduction in shear and/or pull off forces can be observed by changing the flexural modulus of the hook elements. The change in flexural modulus properties can be made individually, or in combination with the change in shape orientation. For example, increasing the flexural modulus properties of the hook elements (i.e., make the hook elements stiffer) will increase the shear and/or pull-off forces for disengagement. Conversely, decreasing the flexural modulus properties of the hook elements can be used to decrease the shear and/or pull-off forces when engaged.

Shape memory alloys can exist in two different temperature-dependent phases, i.e., the so-called martensite and austenite phases. The martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which martensite finishes transforming to martensite is called the martensite finish temperature ($M_f$). Generally, the shape memory alloys are soft and easily deformable in their martensite phase and are hard, stiff, and/or rigid in the austenitic phase.

Shape memory alloys can exhibit a one-way shape memory effect or a two-way shape memory effect depending on the alloy composition. One-way shape memory materials exhibit shape memory effects only when heated. A two-way shape memory material is characterized by having a low temperature martensitic phase and a high temperature austenitic phase, and by the ability to transition between the two phases whenever the material's temperature passes below the martensitic phase transition temperature or above the austenitic phase transition temperature. These two transition temperatures are intrinsic characteristics of the material.

Figure 4:
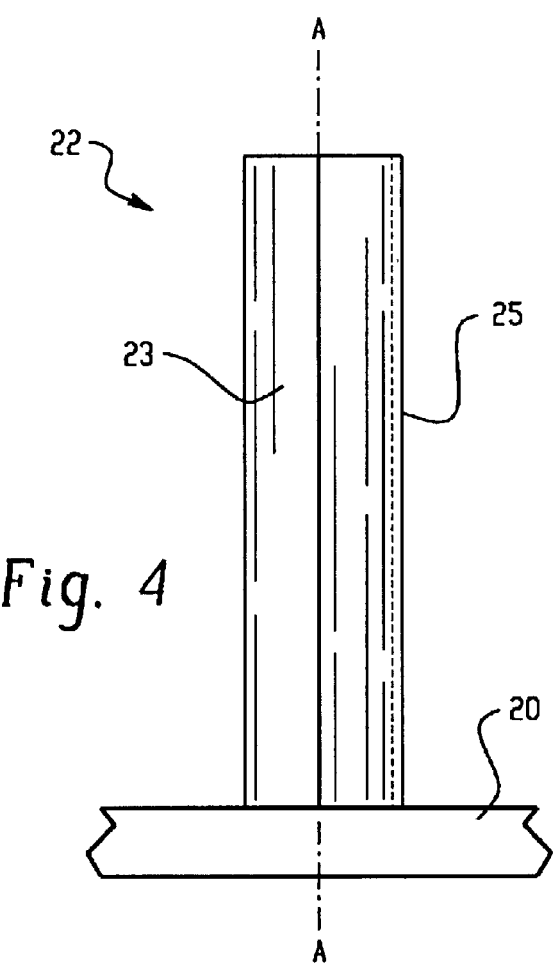
FIG. 4 is a cross sectional view of a hook element in accordance with an embodiment.
Figure 5:
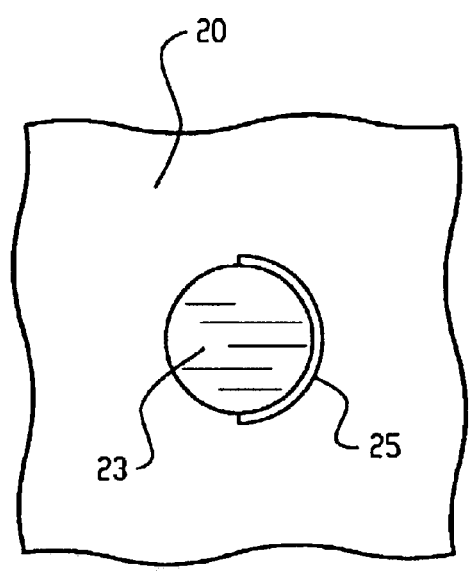
FIG. 5 is a top plan view of the hook element depicted in FIG. 4.

FIGS. 4 and 5 illustrate a hook element 22 comprising a fiber 23 with a non-axisymmetrically applied shape memory alloy 25 deposited on the support 20. The fiber 23 is preferably coated with the shape memory alloy 25 about a portion of the fiber surface. More preferably, the fiber 23 is coated along a perimeter defined by a plane extending parallel from a longitudinal central axis (A) of the fiber 23. Optionally, only a portion of the fiber 23 that defines an engageable portion is coated with the shape memory alloy. As used herein, the term "engageable portion" refers to a portion of the fiber 23 that physically engages the loop material 18 when the hook portion 14 and loop portion 12 are in face-to-face engagement. In this manner, the engageable portion can be manipulated back and forth between shape orientations suitable for engagement and disengagement. In this embodiment, the shape memory alloy material is preferably selected to exhibit a two-way shape memory effect. Non-axisymmetric stress can be used to cause the bending of the coated fibers to form the engageable hook-like shape orientation at about the martensite temperature. Upon heating the non-axisymmetrically hook elements 22 to a temperature greater than the austenite finish temperature, the hook elements 22 change to a substantially straightened shape orientation, thereby reducing shear and pull-off forces in an engaged hook and loop portion. Upon cooling below the austenite temperature back to martensite transformation temperature, the hook elements revert back to the hook-like shape orientation and can be used to re-engage the loop portion 18.

The temperature at which the shape memory alloy remembers its high temperature form when heated can be adjusted by slight changes in the composition of the alloy and through heat treatment. In nickel titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the hook elements with shape memory effects, superelastic effects, and high damping capacity. The "superelastic effects" allow the shape memory alloy to be deformed and restrained in the deformed condition, with such deformation causing the phase transformation. Once the restraint is removed and the stress is reduced, the shape memory alloy composition exhibiting the superelastic effect can return to its original undeformed shape by transformation back to the original phase.

Suitable shape memory alloy materials for coating the hook elements include, but are not intended to be limited to, nickel titanium based alloys, indium-titanium based alloys, nickel aluminum based alloys, copper based alloys (e.g., copper-zinc alloys, copper-aluminum alloys, copper-gold, and copper-tin alloys), gold cadmium based alloys, iron-platinum based alloys, iron palladium based alloys, silver-cadmium based alloys, indium-cadmium based alloys, manganese-copper based alloys, and the like. The alloys can be binary, ternary, or any higher order so long as the alloy composition exhibits a shape memory effect, e.g., change in shape orientation, changes in flexural modulus properties, damping capacity, and the like. A preferred shape memory alloy is a nickel-titanium based alloy commercially available under the name of NITINOL (an acronym for NIckel TItanium Naval Ordnance Laboratory).

The fibers may be formed integrally with support 20, or more preferably, may be attached to the support 20. For example, an adhesive can be applied (e.g., silver-doped epoxy) to the substrate and the shape memory alloy hook elements can be mechanically pressed into the adhesive. Alternatively, vapor grown fibers can be deposited directly from a gas phase onto support 20 and subsequently coated with the shape memory alloy. Suitable fiber materials include, but are not intended to be limited to, plastics, fabrics, metals, and the like. Exemplary fibers suitable for use include carbon fibers, carbon nanotubes, metallic wires, polymer fiber, (e.g., polystyrene, polymethylmethacrylate, polyimides, polyamides, and the like), and the like. Preferably, the fiber material, the thickness of the fibers 23, and the thickness of the shape memory alloy coating are chosen to provide resiliency and flexibility to the coated hook elements. The thickness of the shape memory alloy coating should also be of a thickness effective to provide the desired shape memory effect. The fiber material and dimensions should be selected to withstand the desired shape memory alloy coating/deposition processes and temperatures employed for changing the shape orientation and/or flexural modulus. Although the shape of the fiber depicted in the Figures is cylindrical, other shapes are suitable such as, for example, fibers having a cross-sectional shape of an oval, a cross, a square, a rectangle, and the like. As such, the fibers 23 are not intended to be limited to any particular shape.

In practice, the spacing between adjacent hook elements 22 is in an amount effective to provide the hook portion 12 with sufficient shear and/or pull off resistance desired for the particular application during engagement with the loop portion 14. Depending on the desired application, the amount of shear and/or pull-off force required for effective engagement can vary significantly. Generally, the closer the spacing and the greater number of the hook elements 22 employed will result in increased shear and/or pull off forces upon engagement. The hook elements 22 preferably have a shape configured to become engaged with the loop material 18 upon pressing contact of the loop portion 12 with the hook portion 14, and vice versa. As such, the hook elements 22 are not intended to be limited to any particular shape. In the engaged mode, the hook elements 22 can have an inverted J-shaped orientation, a mushroom shape, a knob shape, a multi-tined anchor, T-shape, spirals, or any other mechanical form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a female and male engagement), or any other mechanical form of a loop-like element used for separable hook and loop fasteners.

The arrays of hook elements 22 of various geometries and/or loop material 18 on the two supports 16, 20 are to be so arranged and sufficiently dense such that the action of pressing the two portions 12, 14 together results in the mechanical engagement of the hook elements 22 with the loop material 18 creating a joint that is strong in shear and pull-off forces, and relatively weak in peel. Remote disengagement of the two portions 12, 14 is effected variously by raising the temperature of the shape memory alloy above its transformation temperature causing the hook elements to straighten (e.g. in those examples in which the shape memory property of the shape memory alloy is employed), and/or by lowering the temperature of the shape memory alloy to effect a switch from the stiffer austenite to the weaker martensite phase (e.g. in those examples in which the super-elasticity property of shape memory alloys is employed). In this manner, changing the shape orientation and/or flexural modulus properties of the hook elements can be used to provide on-demand remote engagement and disengagement of joints/attachments.

The loop material 18 generally comprises a random looped pattern or pile of a material. The loop material is often referred by such terms as the "soft", the "fuzzy", the "pile", the "female", or the "carpet". Suitable loop materials are commercially available under the trademark VELCRO from the Velcro Industries B.V. Materials suitable for manufacturing the loop material include thermoplastics such as polypropylene, polyethylene, polyamide, polyester, polystyrene, polyvinyl chloride, acetal, acrylic, polycarbonate, polyphenylene oxide, polyurethane, polysulfone, and the like. The loop material 18 may be integrated with the support or may be attached to the support.

Alternatively, the loop material 18 can be coated with the shape memory alloy material. As such, instead of being passive, the loop material 18 can be made active upon receipt of the activation signal, e.g., a thermal signal. Activating the shape memory alloy coated onto the loop material 18 causes a change in shape orientation and/or flexural modulus property, which can be used to provide a marked-reduction of shear and pull-off forces of an engaged hook and loop portion.

The supports 16 (loop portion 12) or 20 (hook portion 14) may be rigid or flexible depending on the intended application. Suitable materials for fabricating the support include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the hook elements 22 or loop material) for application of the releasable fastener system to an apparatus or structure. Alternatively, the releasable fastener system 10 may be secured to an apparatus or structure by bolts, by welding, or any other mechanical securement means. It should be noted that, unlike traditional hook and loop fasteners, both supports 16, 20 could be fabricated from a rigid or inflexible material in view of the remote releasing capability provided. Traditional hook and loop fasteners typically require at least one support to be flexible so that a peeling force can be applied for separation of the hook and loop fastener.

The support 20 may also comprise the activation device 24 for providing the thermal activating signal to the hook elements and/or loop material depending on the particular design of the releasable fastener system. For example, the support 20 may be a resistance type-heating block to provide a thermal energy signal sufficient to cause a shape change and/or change in flexural modulus properties.

The shape memory material coated or deposited onto the fibers may be activated by any suitable means, preferably a means for subjecting the material to a temperature change above, or below, a transition temperature. For example, for elevated temperatures, heat may be supplied using hot gas (e.g. air), steam, induction heating, electrical current, or the like. The activation means may, for example, be in the form of a heated room or enclosure, or an iron for supplying heat, a hot air blower or jet, means for passing an electric current through, or inducing art electrical current in (e.g. by magnetic or microwave interaction), the shape memory material (or through or in an element in thermal contact therewith). In the case of a temperature drop, heat may be extracted by using cold gas, or evaporation of a refrigerant. The activation means may, for example, be in the form of a cool room or enclosure, a cooling probe having a cooled tip, a cold air blower or jet, or means for introducing a refrigerant (such a liquid nitrogen) to at least the vicinity of the shape memory material.

Shape setting or training of the hook elements can be made by constraining to the hook element on a mandrel or fixture of the desired shape and applying an appropriate heat treatment. The shape can also be imparted by surface treatments such as application of high-energy beams from ion or laser sources or other mechanical means such as by shot peening or polishing. The heat treatment methods used to set the shape in both shape memory and superelastic forms of the shape memory alloy are similar. The heat treatment parameters chosen to set both the shape and the properties of the hook elements usually need to be determined experimentally. For example, shape setting nickel titanium shape memory alloys generally requires a temperature greater than about 400° C. for a period of time greater than about 1 minute. Rapid cooling of some form is preferred via a water quench or rapid air cool (if both the parts and the fixture are small). Higher heat treatment times and temperatures will increase the actuation temperature of the part and often gives a sharper thermal response (in the case of shape memory elements). Alternatively, the shape memory alloy may be cooled below $M_f$ and bent to a desired shape. The hook element is then heated to a temperature above $A_f$ and allowed freely to take its austenite shape. The procedure is repeated about 20 to about 30 times, which completes the training. The sample now assumes its programmed shape upon cooling under $M_f$ and to another shape when heated above $A_f$. In another embodiment, the hook element is bent just above $M_s$ to produce the preferred variants of stress-induced martensite and then cooled below the $M_f$ temperature. Upon subsequent heating above the $A_f$ temperature, the specimen takes its original austenitic shape. This procedure is repeated about 20 to about 30 times.

The shape memory material may be activated by any suitable means, preferably a means for subjecting the material to a temperature change above, or below, a transition temperature. For example, for elevated temperatures, heat may be supplied using hot gas (e.g. air), steam, or electrical current. The activation means may, for example, be in the form of a heated room or enclosure, or an iron for supplying heat, a hot air blower or jet, means for passing an electric current through, or inducing an electrical current in (e.g. by magnetic or microwave interaction) the shape memory material (or through or in an element in thermal contact therewith). In the case of a temperature drop, heat may be extracted by using cold gas, or evaporation of a refrigerant. The activation means may, for example, be in the form of a cool room or enclosure, a cooling probe having a cooled tip, a cold air blower or jet, or means for introducing a refrigerant (such a liquid nitrogen) to at least the vicinity of the shape memory material.

It will be appreciated that any number of different products or structural elements can be disassembled using this technique. It is not necessary to know and physically locate the exact position of each fastener of a product. Instead, it is simply necessary to know the transition temperature(s) of the shape memory material(s) within the products, to enable the material to be "activated".

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A releasable fastener system comprising:
   a loop portion comprising a support and a loop material attached to the loop support;
   a hook portion comprising a hook support and a plurality of hook elements attached to the hook support, wherein the plurality of hook elements comprises a fiber and a shape memory alloy coating deposited onto the fiber, and wherein shape memory alloy coating deposited onto the fiber comprises a non-axisymmetric coating or deposition or the shape memory alloy about a portion of the fiber surface; and
   an activation device coupled to the plurality of hook elements, the activation device being operable to selectively provide a thermal activation signal to the shape memory alloy and change the shape orientation, the flexural modulus property, or a combination of the shape orientation and flexural modulus properties of the plurality of hook elements to reduce a shear force and/or a pull-off force of an engaged hook and loop portion.

2. The releasable fastener system of claim 1, wherein the fiber and the shape memory alloy coating deposited onto the fiber comprises a coating along a perimeter of the fiber defined by a plane extending parallel from a longitudinal central axis of the fiber.

3. The releasable fastener system of claim 2, wherein the coating along the perimeter of the fiber is limited to an engageable portion of the hook element.

4. The releasable fastener system of claim 1, wherein the fiber comprises a plastic, fabric, or a metal.

5. The releasable fastener system of claim 1, wherein the shape memory alloy comprises a nickel titanium based alloy, an indium-titanium based alloy, a nickel aluminum based alloy, a copper based alloy, a gold cadmium based alloy, an iron-platinum based alloys, silver-cadmium based alloys, indium-cadmium based alloys, manganese-copper based alloys, an iron palladium based alloys, combinations comprising at least one of the foregoing alloys.

6. The releasable fastener system of claim 1, wherein the hook support and the loop support comprises an inflexible material.

7. A process for operating a releasable fastener system, the process comprising:

contacting a loop portion with a hook portion to form a releasable engagement, wherein the loop portion comprises a support and a loop material attached to the support, and wherein the hook portion comprises a support and a plurality of hook elements attached to the support, wherein the plurality of hook elements comprises a fiber and a shape memory alloy coating deposited onto the fiber, and wherein the fiber and the shape memory alloy coating comprises a non-axisymmetric coating or deposition of the shape memory alloy about a portion of the fiber surface;

maintaining constant shear and pull-off forces in the releasable engagement without introducing an energy signal;

selectively introducing a thermal activation signal to the hook elements, wherein the thermal activation signal is effective to change a shape orientation, a flexural modulus property, or a combination thereof to the plurality of hook elements; and reducing the shear and/or pull off forces in the releasable engagement.

8. A hook portion for a releasable fastener system comprising: a support; and a plurality of hook elements attached to the support, wherein the plurality of hook, elements comprises a fiber and a shape memory alloy coating deposited onto the fiber, and wherein the fiber and the shape memory alloy coating comprises a deposition of the shape memory alloy about a portion of the fiber surface, wherein the fiber and the shape memory alloy coating about the portion of the fiber are disposed along a perimeter of the fiber defined by a plane extending parallel from a longitudinal central axis of the fiber.

9. The hook portion of claim 8, wherein the coating along the perimeter of the fiber is limited to an engageable portion of the hook element.

10. The hook portion of claim 8, wherein the fiber is a material selected from the group consisting of a plastic, a fabric, and metal.

11. The hook portion of claim 8, wherein the shape memory alloy comprises nickel titanium based alloys, indium-titanium based alloys, nickel aluminum based alloys, copper based alloys, gold cadmium based alloys, iron-platinum based alloys, silver-cadmium based alloys, indium-cadmium based alloys, manganese-copper based alloys, iron palladium based alloys, and combinations comprises comprising at least one of the foregoing alloys.

12. A releasable fastener system comprising:

a loop portion comprising a support and a loop material attached to the support;

a hook portion comprising a support and a plurality of hook elements attached to the support, wherein the plurality of hook elements comprises a fiber and a shape memory alloy coating deposited onto the fiber, and wherein the fiber and the shape memory alloy coating or deposition disposed on the surface of the fiber comprises a non-axisymmetric coating or deposition of the shape memory alloy about a portion of the fiber surface; and means for changing of the shape orientation, the flexural modulus property, or the combination thereof of the hook elements to reduce a shear force and/or a pull-off force of an engaged hook and loop portion.

* * * * *